United States Patent [19]

Cordier et al.

[11] 4,086,325

[45] Apr. 25, 1978

[54] PROCESS FOR DRYING SOLUTIONS CONTAINING BORIC ACID

[75] Inventors: Jean-Pierre Cordier, Braine-le-Comte; Marc Vandorpe, Retie, both of Belgium

[73] Assignee: Belgonucleaire, S.A., Brussels, Belgium

[21] Appl. No.: 768,273

[22] Filed: Feb. 14, 1977

[30] Foreign Application Priority Data

Feb. 13, 1976 Belgium .................................. 17207

[51] Int. Cl.[2] .............................................. C01B 15/12

[52] U.S. Cl. ............................ 423/280; 252/301.1 W; 423/281

[58] Field of Search ................ 252/301.1 W; 423/281, 423/279, 280

[56] References Cited

U.S. PATENT DOCUMENTS 3,557,013 1/1971 Detilleux et al. ............ 252/301.1 W

OTHER PUBLICATIONS

Chemical Abstracts #52:112*c*.

*Primary Examiner*—Benjamin R. Padgett
*Assistant Examiner*—Deborah L. Kyle
*Attorney, Agent, or Firm*—Ostrolenk, Faber, Gerb & Soffen

[57] ABSTRACT

The process of drying concentrates containing boric acid and/or borates after addition of lime is improved by the addition of an oxidizing agent to the concentrate.

4 Claims, No Drawings

PROCESS FOR DRYING SOLUTIONS CONTAINING BORIC ACID

This invention relates to the processing of contaminated solutions containing boric acid and/or boric acid salts.

Boric acid is especially used in nuclear reactors, in particular, in pressurized water reactors, as a neutron absorber. Indeed, the setting of the available reactivity in these reactors can be effected by varying the boric acid content of the cooling fluid.

In order to change the reactivity using boric acid, it is therefore necessary to bleed off some coolant or to inject boric acid into it.

The solution containing boric acid extracted in a bleeding operation is either recovered or concentrated by evaporation before carrying out an insolubilization treatment. This insolubilization is imperative as far as the storage of the concentrates is concerned since they are contaminated with radioactive substances.

The insolubilization processes presently used for such concentrates consist in embedding concentrate in cement, plastics or bitumen, as the case may be, after drying of the concentrate.

Direct embedding in cement or plastics can give rise to homogeneity problems as regards the product to be stored. For that reason, it is preferable to dry the concentrates before embedding them.

However, the drying of concentrates containing boric acid is not simple. Indeed, it is noted that drying equipment is easily jammed by setting of the product and that the dried product does not have a physical form suitable for embedding.

It has already been suggested to add lime when drying the concentrates which prevents jamming of the drying equipment and improves the physical form of the dried product. Indeed, lime converts soluble borates into insoluble calcium borates but too much lime must be added in order to obtain suitable drying which leads to an excessive increase in the quantity of product to be stored.

Furthermore, the boron decontamination factor associated with the drying is not very high. It is generally of an order of magnitude ranging from 1000 to 3000. By boron decontamination factor is meant the ratio of the boron concentrations in the concentrate and evaporated water.

This invention relates to a process which makes it possible to decrease the quantity of product to be stored and to increase the boron decontamination factor.

The invention provides a process for the drying of concentrates containing boric acid and/or borates through evaporation of these concentrates after addition of lime, wherein an oxidizing agent is added to the concentrate.

The oxidizing agent can be hydrogen peroxide, a permanganate, a chromate and, in general, any oxidizing agent compatible with the boric acid and lime concentrate. The use of hydrogen peroxide is preferred because it is a strong oxidizing agent which, in addition to oxygen atoms, only introduces water molecules into the concentrate.

The quantity of oxidizing agent to be added is determined by the stoichiometry of the conversion reaction which will take place, i.e., the formation of perborates. Thus, for example, when using hydrogen peroxide, one mole of hydrogen peroxide will be added per mole of soda present in the concentrate. It should be noted that borates are generally present as sodium borates.

The addition of an oxidizing agent has multiple effects on the concentrates containing boric acid and/or borates.

Indeed, by oxidizing the concentrate, the soluble borates are converted to insoluble perborates which makes it possible to decrease the quantity of lime to be added.

Furthermore, it has been noted that perborates do not have a tendency to polymerize during drying which prevents the formation of agglomerates. In addition, perborates are insoluble in water and therefore undergo little entrainment with steam thus increasing considerably the boron decontamination factor which can easily have an order of magnitude ranging from 20,000 to 40,000.

The invention is illustrated below by an example which is in no way restrictive.

A solution to be dried contained 12% boric acid. After neutralization with sodium hydroxide to a pH ranging from 9 to 10, a quantity of lime equivalent to 60% of the quantity of boric acid was added. The sodium borate was then oxidized to the perborate by adding $H_2O_2$. The molar quantity of hydrogen peroxide added was equal to the molar quantity of soda present in the solution. Drying gave a dry product at the rate of 1.30 kg of dry product per kg of boric acid. The bulk specific gravity of the bulk product was 0.70 for a residual humidity of less than 10%. The actual specific gravity of the dry product was of the order of 1.90.

A similar solution treated with lime only required the addition of 1 kg of lime per kg of boric acid which resulted in the production of at least 1.5 kg of dry product per kg of boric acid.

It is obvious that the invention is not limited to the details given but must be considered as embodying all variations which may apply to drying. In particular, the invention is not limited to the addition of hydrogen peroxide, any other oxidizing agent being usable. In addition, it is obvious that incorporation does not necessarily have to be in bitumen but can also be in synthetic resins or any other embedding agent. Furthermore, the invention is not restricted to boric acid applications resulting from use in nuclear reactors but also relates to the drying of concentrates containing boric acid and/or borates contaminated with any noxious substance.

We claim:

1. A process for drying concentrates containing boric acid and/or borates by evaporation of these concentrates after addition of lime characterized in that the amount of lime is insufficient to convert all of the boric acid or borates to calcium borate and that an oxidizing agent is added to the concentrates wherein the oxidizing agent is employed in an amount sufficient to convert the boric acid or borates to perborate.

2. A process according to claim 1 characterized in that the oxidizing agent is hydrogen peroxide.

3. A process for the insolubilization of concentrates containing boric acid and/or borates in an embedding agent, characterized in that the concentrates are dried using the process according to claim 1 before incorporating in said agent.

4. A process according to claim 3 wherein the oxidizing agent is hydrogen peroxide.

* * * * *